Oct. 6, 1936.  V. C. NORQUIST ET AL  2,056,802
TANK VEHICLE
Filed Sept. 20, 1934   2 Sheets-Sheet 1
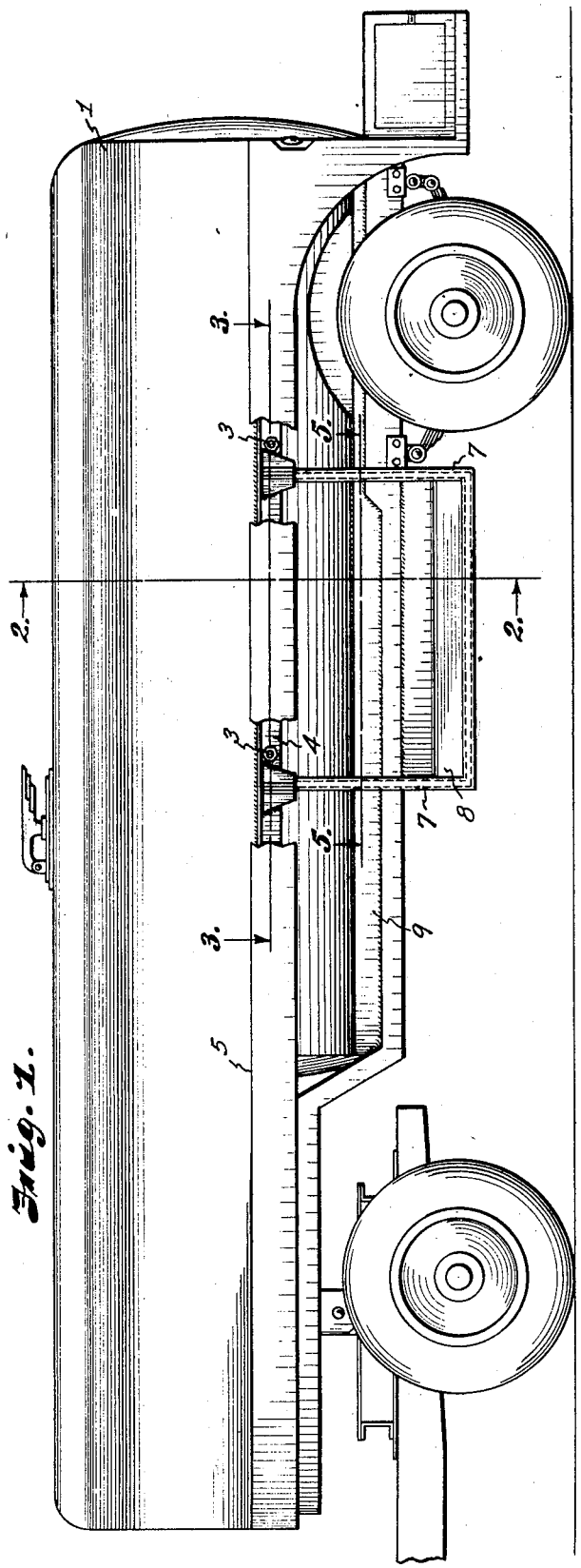
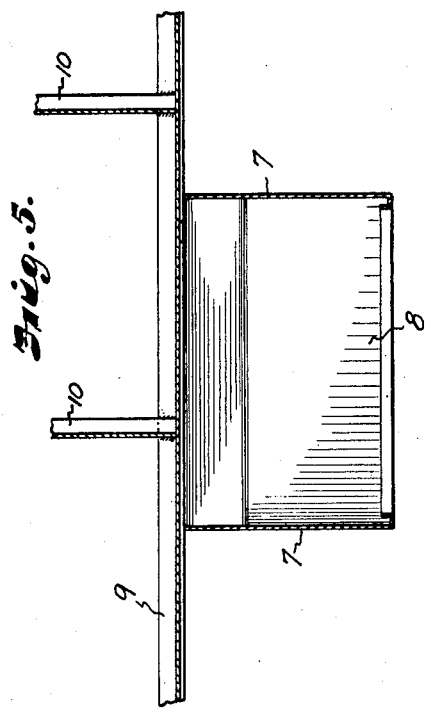
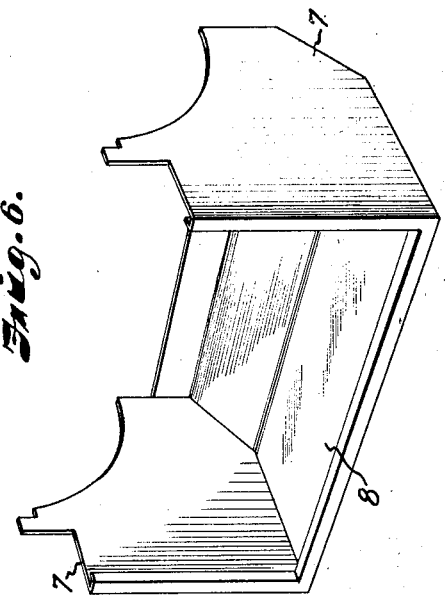
INVENTOR.
Victor C. Norquist
and Ralph A. Bradley
BY Thos. E. Scofield
ATTORNEY.

Oct. 6, 1936. V. C. NORQUIST ET AL 2,056,802
TANK VEHICLE
Filed Sept. 20, 1934   2 Sheets-Sheet 2
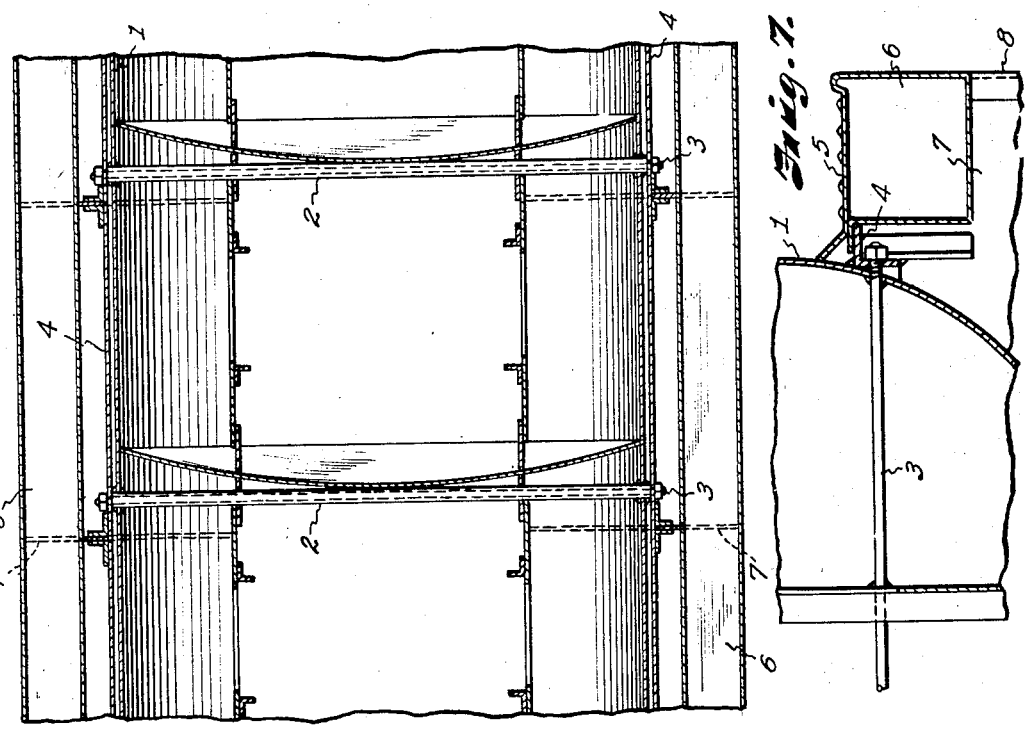
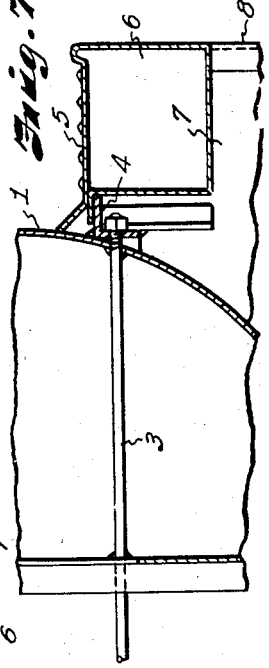
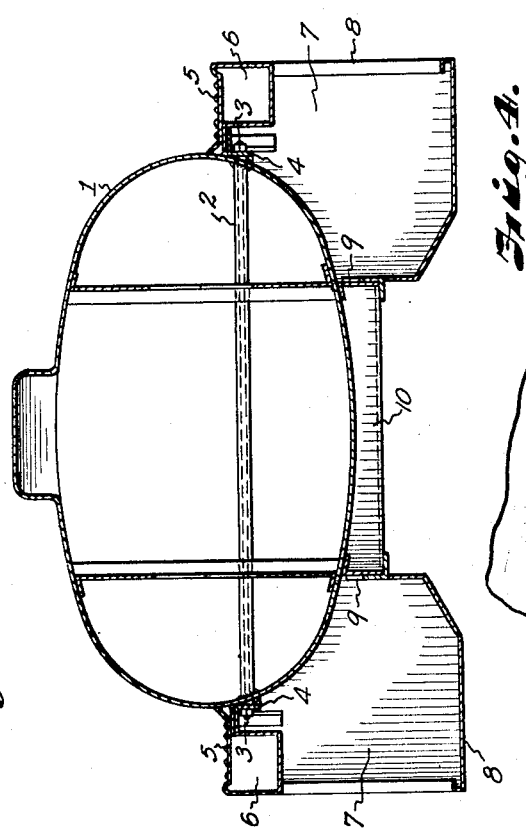
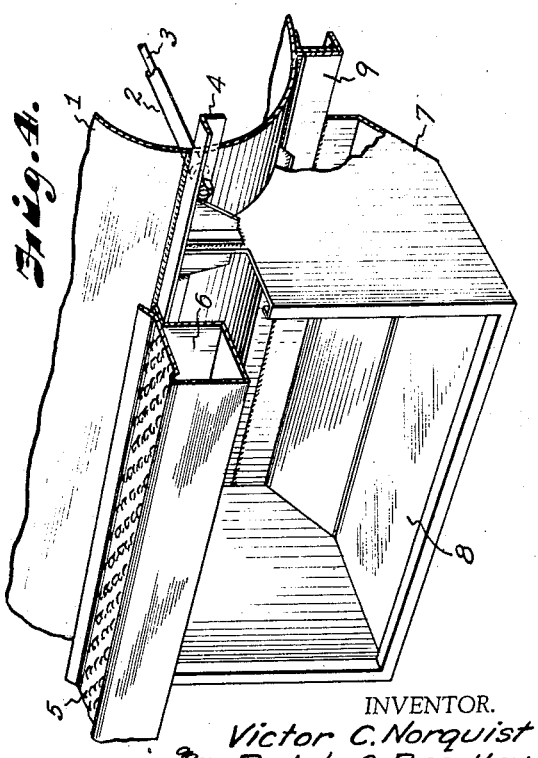
INVENTOR.
Victor C. Norquist
and Ralph A. Bradley
BY
Thos. C. Scofield
ATTORNEY.

Patented Oct. 6, 1936

2,056,802

UNITED STATES PATENT OFFICE 2,056,802

TANK VEHICLE

Victor C. Norquist and Ralph A. Bradley, Kansas City, Mo., assignors to Butler Manufacturing Company, Kansas City, Mo., a corporation of Missouri Application September 20, 1934, Serial No. 744,808

9 Claims. (Cl. 280—5)

Our invention relates to tank vehicles.

This application is a continuation in part of our co-pending application, Serial No. 675,766 for "Tank vehicles", filed June 14, 1933.

In tank vehicles, it is customary to carry barrels filled with liquids of other kinds than those carried by the main tank, suspended from the tank construction.

One object of our invention is to provide a means for suspending a running board on either side of the tank.

Another object of our invention is to provide means for suspending a receptacle, commonly referred to as a barrel carrier, from the tank.

In the accompanying drawings which form part of the instant specification and are to be read in conjunction therewith and in which like reference numerals are used to indicate like parts in the various views;

Figure 1 is a side elevation with parts broken away, showing a tank embodying one mode of carrying out our invention.

Figure 2 is a sectional view taken on a line 2—2 of Figure 1.

Figure 3 is a sectional view taken on a line 3—3 of Figure 1.

Figure 4 is a perspective view with parts broken away, showing details of our invention.

Figure 5 is a sectional view taken on a line 5—5 of Figure 1.

Figure 6 is a perspective view showing a receptacle which is carried by our novel construction.

Figure 7 is a fragmentary sectional view on an enlarged scale similar to the view in Figure 2, and showing a modified form of carrying out our invention.

In general, our invention contemplates the provision of a plurality of members extending transversely through the tank and secured thereto, to which members are secured webs which in turn support the running board and the barrel carrier.

A tank shell 1, formed in any suitable manner, is provided with transversely extending tubular members 2 which are welded to the tank shell and extend to or through the walls of the shell 1. At the point of passage of the tubular members 2 through the tank shell walls, they are welded or otherwise secured in any suitable manner. By referring to Figure 3, it will be seen that they are spaced at suitable intervals. Extending through the tubular members 2 are tension rods 3 which are screw threaded at their outer ends. Longitudinally extending channel members 4 are positioned on each side of the tank and are held and supported by tension rods 3. Also secured to channel members 4 by welding or in any other suitable manner are running boards 5, which are formed in the shape of hollow boxlike members, as can readily be seen by reference to Figures 2, 4, and 7. The space 6 can be used for carrying the hose. Welded to the channel members 4 are barrel carriers 7, the side walls 8 of which form webs which also support the running boards and hose carrying members.

Referring to Figure 7 in which a modification of the invention is shown, it will be noted that the tension rods 3 extend directly through the tank, being welded to the side walls thereof at the point of passage therethrough. It will be understood that any suitable tension members may be used such as rods, wire cables, or the like. The tank is stiffened by longitudinally extending beams 9 which are connected by cross beams 10, the longitudinal and cross beams being welded to the tank shell. The lower ends of the barrel carriers are secured to the longitudinal tank beams 9, as can readily be seen by reference to Figure 2. It will be seen that the weight of the running board hose carrier and barrel carriers are prevented from deforming the shell by the tension members 3. But for these members, the tank shell would have to bear this tension load, tending to alter the shape of the shell.

It will be seen that we have accomplished the objects of our invention. We have provided a novel means of securing a running board which enables a tank attendant to operate the manhole covers of the tank and to move along the tank on either side. Empty barrels or barrels full of lubricating oil, in event the tank is used to carry gasoline, are provided. The construction is simple and removes the load from the tank shell, which would otherwise have to be carried thereby. In this manner, we are enabled to make our tank out of lighter material, while maintaining secure support for the running board and barrel carrier.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A tank vehicle including in combination a tank, a plurality of transverse tubular members extending through said tank, tension members positioned in said tubular members and extending beyond the tank on opposite sides thereof, and a running board supported from said tension members.

2. A tank vehicle including in combination a tank, a plurality of transverse tubular members extending through said tank, tension members positioned in said tubular members and extending beyond the tank on opposite sides thereof, and a barrel carrier supported from said tension members.

3. A tank vehicle including in combination a tank, a plurality of transverse tubular members extending through said tank, tension members positioned in said tubular members and extending beyond the tank on opposite sides thereof, and a running board and a barrel carrier supported from said tension members.

4. A tank vehicle comprising in combination a tank, a plurality of transverse tension members extending through said tank and spaced at intervals and having ends projecting beyond the tank walls, a longitudinal channel member supported by said tension members, and a barrel carrier supported by said channel member.

5. A tank vehicle comprising in combination a tank, a plurality of transverse tension members extending through said tank and spaced at intervals and having ends projecting beyond the tank walls, a longitudinal channel member supported by said tension members, and a running board supported by said channel member.

6. A tank vehicle comprising in combination a tank, a plurality of transverse tension members extending through said tank and spaced at intervals and having ends projecting beyond the tank walls, a pair of channel members supported by said tension members on opposite sides of the tank, and barrel carriers and running boards supported by said channel members.

7. A tank vehicle comprising in combination a tank, a plurality of transverse tubular members extending through said tank, tension members positioned in said tubular members and spaced at intervals and having ends projecting beyond the tank walls, a longitudinal channel member supported by said tension members, and a barrel carrier supported by said channel member.

8. A tank vehicle comprising in combination a tank, a plurality of transverse tubular members extending through said tank, tension members positioned in said tubular members and spaced at intervals and having ends projecting beyond the tank walls, a longitudinal channel member supported by said tension members, and a running board supported by said channel member.

9. A tank vehicle comprising in combination a tank, a plurality of transverse tubular members extending through said tank, tension members positioned in said tubular members and spaced at intervals and having ends projecting beyond the tank walls, a pair of channel members supported by said tension members on opposite sides of the tank, and barrel carriers and running boards supported by said channel members.

VICTOR C. NORQUIST.
RALPH A. BRADLEY.